(12) United States Patent
Loewen et al.

(10) Patent No.: US 10,535,436 B2
(45) Date of Patent: Jan. 14, 2020

(54) NUCLEAR REACTOR CHIMNEY AND METHOD OF IMPROVING CORE INLET ENTHALPY USING THE SAME

(71) Applicants: Eric Paul Loewen, Wilmington, NC (US); David Johnathan Keck, Wilmington, NC (US); Nicholas O'Neill, Wilmington, NC (US)

(72) Inventors: Eric Paul Loewen, Wilmington, NC (US); David Johnathan Keck, Wilmington, NC (US); Nicholas O'Neill, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 1343 days.

(21) Appl. No.: 14/154,601

(22) Filed: Jan. 14, 2014

(65) Prior Publication Data

US 2015/0200023 A1    Jul. 16, 2015

(51) Int. Cl.
*G21C 15/26*    (2006.01)
*G21C 13/02*    (2006.01)
*G21C 15/02*    (2006.01)

(52) U.S. Cl.
CPC ............. *G21C 15/26* (2013.01); *G21C 13/02* (2013.01); *G21C 15/02* (2013.01); *Y10T 29/49718* (2015.01)

(58) Field of Classification Search
CPC ...................................................... G21C 15/26
(Continued)

(56) References Cited

U.S. PATENT DOCUMENTS 2,917,373 A * 12/1959 Roquemore ........... B01J 8/1872
                                                        208/147
3,127,324 A *  3/1964 Parr ......................... G21C 3/36
                                                        165/157
(Continued)

FOREIGN PATENT DOCUMENTS

EP        0060777 A1    9/1982
GB        1292431 A    10/1972
(Continued)

OTHER PUBLICATIONS

European Search Report and Opinion issued in connection with corresponding EP Application No. 15150922.1 dated Jun. 15, 2015.
(Continued)

*Primary Examiner* — Lily C Garner
(74) *Attorney, Agent, or Firm* — Harness, Dickey & Pierce, P.L.C.

(57) ABSTRACT

A chimney of a nuclear reactor may include a hollow body with an interior surface and an opposing exterior surface; and a plurality of trip structures on the exterior surface of the hollow body. The chimney may be used in a method of improving a core inlet enthalpy of a nuclear reactor. The method may include interrupting a downward flow of water within a downcomer region of a reactor pressure vessel with a plurality of first trip structures. The downcomer region is an annular space defined by the reactor pressure vessel and a chimney within the reactor pressure vessel. The plurality of first trip structures are disposed on an exterior surface of the chimney.

11 Claims, 9 Drawing Sheets

(58) Field of Classification Search
USPC .......................................................... 376/260
See application file for complete search history.

(56) References Cited

U.S. PATENT DOCUMENTS

| | | | |
|---|---|---|---|
| 3,850,795 A | 11/1974 | Thome | |
| 3,861,999 A | 1/1975 | Zmola et al. | |
| 4,675,152 A | 6/1987 | Verdeau et al. | |
| 5,857,006 A | 1/1999 | Oosterkamp et al. | |
| 5,940,463 A * | 8/1999 | Muramatsu | G21C 1/02 376/290 |
| 2010/0224261 A1* | 9/2010 | White | F28F 9/20 137/15.01 |
| 2014/0037038 A1* | 2/2014 | Uchida | G21C 15/02 376/395 |

FOREIGN PATENT DOCUMENTS

| | | | |
|---|---|---|---|
| JP | 61149894 A | * 7/1986 | |
| JP | 01197696 A | * 8/1989 | |
| JP | H01197696 A | * 8/1989 | G21C 15/02 |
| JP | 2002357688 A | 12/2002 | |
| JP | 5358516 B2 | 12/2013 | |
| WO | 9534898 A1 | 12/1995 | |

OTHER PUBLICATIONS

Search Report issued in connection with corresponding PL Application No. P.410930 dated May 14, 2015.
ESBWR Design Control Document, Rev. 9, Chapters 3-5 (2010) U.S. Nuclear Regulatory Commission website, Accession No. ML103440266 <http://pbadupws.nrc.gov/docs/ML1034/ML103440266.html>.
Kataoka, et al., "Drift flux model for large diameter pipe and new correlation for pool void fraction", Int. J. Heat Mass Transfer. vol. 30, No. 9, pp. 1927-1939, 1987.
Hasanein, et al., "Steam-Water Two-Phase Flow in Large Diameter Vertical Piping At High Pressures and Temperatures", International Conference on Nuclear Engineering, vol. 1—Park B, ASME 1996.
Bharat Shiralkar, Paper and Presentation, "ESBWR Chimney Flow Regimes", Enclosure 2, MFN 09-740, Public Version, GE Hitachi Nuclear Energy Americas, LLC, 2009, 18 total pages.

* cited by examiner

NUCLEAR REACTOR CHIMNEY AND METHOD OF IMPROVING CORE INLET ENTHALPY USING THE SAME

BACKGROUND

Field

The present disclosure relates to the downward flow of water in the downcomer region of a natural circulation type boiling water nuclear reactor.

Description of Related Art

Figure 1:
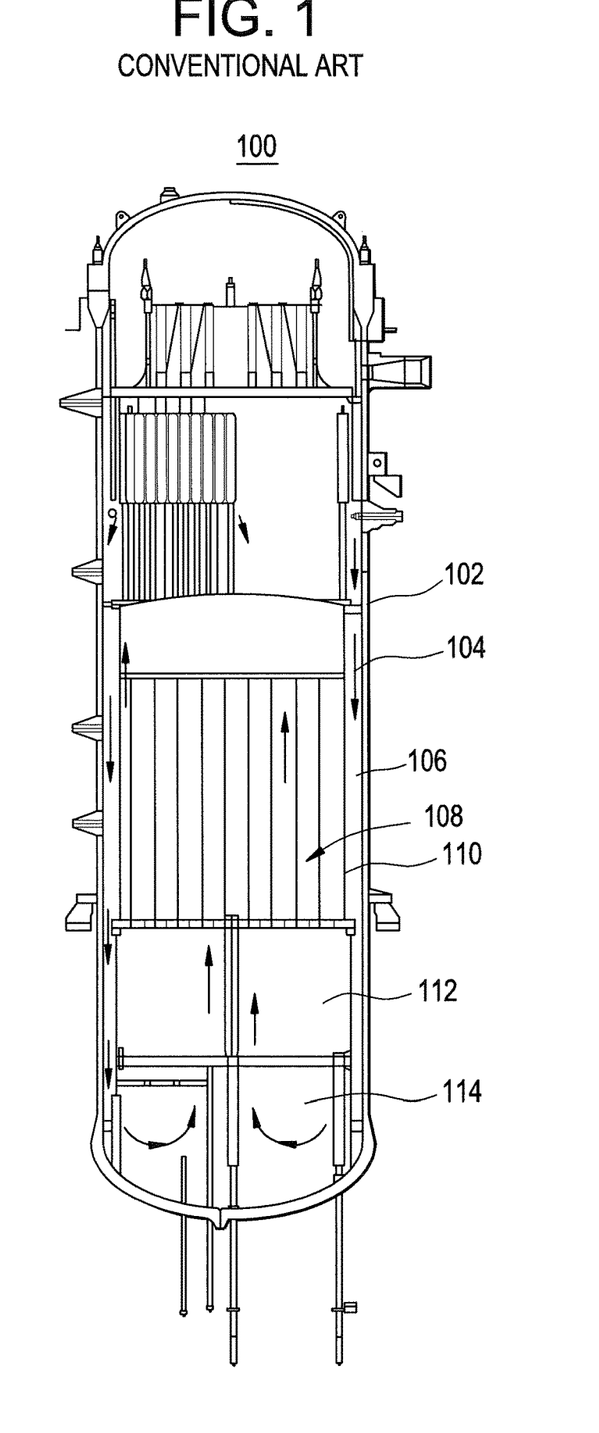
FIG. 1 is a cross-sectional view of a conventional natural circulation type boiling water nuclear reactor.

FIG. 1 is a cross-sectional view of a conventional natural circulation type boiling water nuclear reactor. Referring to FIG. 1, a conventional natural circulation type boiling water nuclear reactor 100 (e.g., economic simplified boiling water reactor (ESBWR)) uses a relatively long chimney 108 between the outlet of the reactor core 112 and the steam separator inlet to establish, enhance, and deliver natural circulation steam up the center region and water down flow 104 in the downcomer region 106 of the reactor pressure vessel 102. In particular, feedwater coolant enters the reactor pressure vessel 102 and mixes with the cycling liquid water separated from the steam and by the force of gravity starts a downward flow 104 in the downcomer region 106. Some mixing occurs from the water exiting the steam separators and steam dryers. The downcomer region 106 is the space between the outer wall of the chimney 108 and the inner wall of the reactor pressure vessel 102. The chimney 108 has a geometry of a right cylinder body of revolution having a constant radius that is about 8.6 meters in length within the reactor pressure vessel 102, which is about 27.6 meters. It should be understood that this dimension is merely provided to give scale rather than to define an absolute length. Next, the water flows toward the outside of the core 112 and returns flow to the core 112 by making a complete flow reversal in the core inlet region 114. The water flows vertically upward due to the decreasing density above the core 112 as a result of steam formation and the water flow in the downcomer region 106. The core of heat-producing fissionable fuel is located above the core inlet region 114.

Conventionally, there are no flow disruptions as the water flows down the outside of the chimney 108. The chimney 108 has a flow length of approximately 8.6 meters and is one of the largest internal components in the nuclear reactor 100. While the chimney 108 has internal partitions to ensure the steam water mixture flows in the vertical direction, there are no provisions to mix the water flow 104 on the outside of the chimney 108. There are also insignificant frictional losses within the downcomer region 106. Furthermore, there is neither an increase in the enthalpy of the steam water mixture inside the chimney 108 nor is there any enthalpy change in the water flowing in the downcomer region 106.

Figure 2:
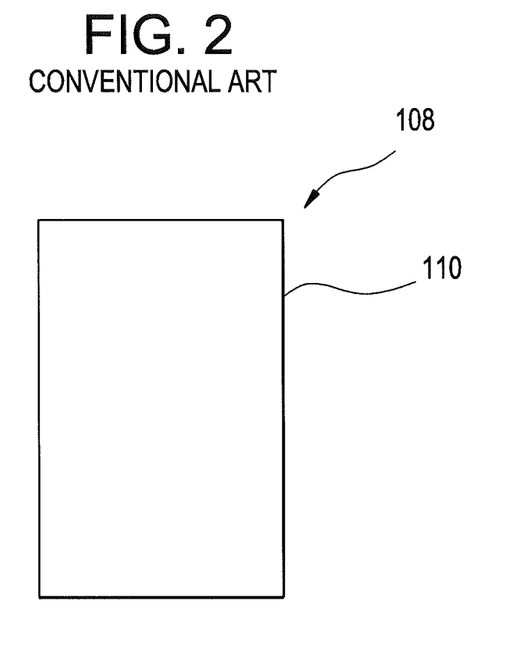
FIG. 2 is a cross-sectional view of a conventional chimney in a natural circulation type boiling water nuclear reactor.

FIG. 2 is a cross-sectional view of a conventional chimney in a natural circulation type boiling water nuclear reactor. Referring to FIG. 2, the exterior surface 110 of the chimney 108 is relatively smooth. There is a lack of homogeneous temperature of the water in the downcomer region 106 due to the relative smoothness of the downcomer region 106. The 8.6 meter height of the chimney 108 results in a flow 104 in the downcomer region 106 to be very similar to a water fall such that there is an increasing downward velocity gradient with relatively little mixing in the axial or radial directions. The lack of a uniform temperature of the water results in non-uniform power generation in the reactor core 112.

BRIEF DESCRIPTION OF EXAMPLE EMBODIMENTS

A chimney of a nuclear reactor may include a hollow body with an interior surface and an opposing exterior surface; and a plurality of trip structures on the exterior surface of the hollow body.

The chimney may be used in a method of improving a core inlet enthalpy of a nuclear reactor. The method may include interrupting a downward flow of water within a downcomer region of a reactor pressure vessel with a plurality of first trip structures. The downcomer region is an annular space defined by the reactor pressure vessel and a chimney within the reactor pressure vessel. The plurality of first trip structures are disposed on an exterior surface of the chimney.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

The present disclosure relates to a downcomer device for use in a natural circulation type boiling water nuclear reactor (e.g., ESBWR), which improves the mixing of water in the downcomer region to improve core inlet enthalpy. The device uses flow breaks to provide mixing micro-zones (e.g., mixing in the axial and/or radial directions) during the downward flow in the downcomer region of a natural circulation reactor. The present disclosure details a device that modifies the existing shape and functionality of the chimney downcomer surface. The device improves the mixing in the chimney downcomer section (as defined by flow characteristics). Although some example embodiments may have been described with reference to an ESBWR, it should be understood that such example embodiments may be useable in other types of natural circulation reactors with two phase flow conditions or where natural circulation is used to remove heat.

In a first example embodiment, enhanced axial and radial mixing in a natural circulation flow system can be attained with changes in the outside surface of the chimney. The surface configurations discussed herein result in axial and radial mixing such that the core inlet conditions are uniform and facilitate the production of uniform radial power in the heat zone. The exterior surface of the chimney and/or the inner surface of the reactor pressure vessel may be provided with flow disrupters. It may be easier to modify the exterior surface of the chimney, since the reactor pressure vessel may be made of a relatively thick carbon steel with a stainless steel cladding. Examples of various designs for optimizing radial and/or axial mixing will be discussed below.

In a non-limiting embodiment, ribs may be provided on the exterior surface of the chimney to enhance mixing (e.g., flow disruption in an adiabatic section of the natural reactor). The ribs can dissipate the flow velocity beside the chimney. The ribs operate continuously when downward flow is established. Mixing may be enhanced by applying boundary layer trips on the chimney outer wall. The trip structures may include weld beads applied at increments on the chimney outer surface. The presence of the trips along the outer wall of the chimney breaks up the thermal and hydrodynamic boundary layers along the outer wall, which, in effect, brings colder water in more intimate contact with the chimney wall. The spacing in the horizontal and/or vertical direction can be increased or decreased to optimize mixing based on the flow conditions and flow channel width.

In another non-limiting embodiment, fins may be provided on the exterior surface of the chimney to enhance mixing. The fins may be characterized by the dimension into the flow field (e.g., length), the dimension along the flow field (e.g., height), and the spacing between the fins. The dimensions may be optimized based on the inlet flow conditions to the downcomer region and the separation between the chimney and the reactor pressure vessel. For instance, a ratio between the length of the fin and the height of the fin may be greater than 1.2, although example embodiments are not limited thereto. A ratio between the length of the fin and the spacing between adjacent fins may be greater than 2.5, although example embodiments are not limited thereto. The angular distribution of the fins may also be adjusted to further enhance the mixing in the downcomer region.

In another non-limiting embodiment, fins that extend irregular lengths into the flow fluid can be provided to create an undulating flow surface along the chimney to increase both the axial and radial mixing. For instance, fins of two different lengths may be arranged in an alternating fashion, although example embodiments are not limited thereto.

In another non-limiting embodiment, the exterior surface of a chimney is provided with a fin that has a flat and level upper surface. The lower surface of the fin is angled and slopes from the distal end of the fin toward the exterior surface of the chimney so as to resemble a right triangle based on a side view. As a result, the generation of non-condensable gases (e.g., oxygen, hydrogen) from the radiolysis of water will not accumulate under the fins since the buoyance force in a low flow conditions will allow the gas to flow upward. Furthermore, the flat upper surface followed by a leading edge may allow better mixing due to different velocity conditions. The spacing between the fins may be optimized based on flow conditions and the width of the flow channel. For instance, a ratio of the length of the fin to the height of the fin may be equal to about 1, although example embodiments are not limited thereto. A ratio of the spacing between adjacent fins to the length of the fin may be equal to about 2, although example embodiments are not limited thereto.

The radial location and angular direction of the fins can be configured such that more horizontal movements occur during the vertical drop of the water such that cold streaks (which typically occur in the conventional art) can be reduced or eliminated.

In another non-limiting embodiment, an inventory region may be provided to increase the inventory water in the downcomer lower region. The inventory region allows a reduction of downcomer turbulence and better mixing before the water enters the core inlet plenum. In particular, the configuration of the chimney wall may be modified to conform to the walls of the interior chimney partitions (which are square structures that are placed inside the cylindrical structure of the chimney). In one instance, the chimney may become a two part structure. A two-part chimney may provide some maintenance and fabrication advantages.

In another non-limiting embodiment, flow interrupters (e.g., ribs, fins) may also be provided on the inner wall of the reactor pressure vessel so as to protrude into the downcomer region. The flow interrupters may have similar dimensions and spacings as the flow interrupters on the chimney. When the flow interrupters are arranged in a staggered fashion, the water may flow through the downcomer region in an undulating flow path.

In another non-limiting embodiment, the mixing efficiency in the downcomer region may be increased by adding turning vanes onto the exterior surface of the chimney. The vanes may twist down the chimney at a desired pitch angle and length. Each vane may have a desired geometry, which may include a vane width and channel height encompassed within an overall section width.

The following examples will be discussed in connection with the accompanying drawings. It should be understood that the various example embodiments discussed herein are merely illustrative in nature and not intended to be limiting. That being said, it should be understood that the various dimensions, arrangements, properties, etc. of one example are also applicable to the other examples unless prohibited based on the principles discussed herein.

Figure 3:
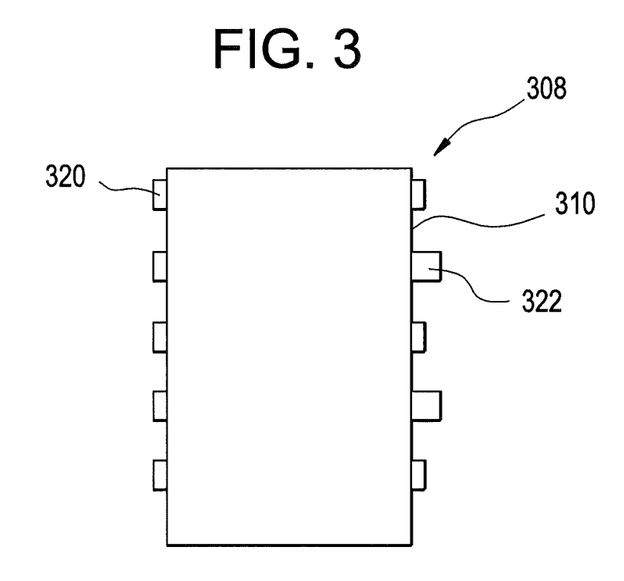
FIG. 3 is a cross-sectional view of a nuclear reactor chimney according to a non-limiting embodiment of the present disclosure.

FIG. 3 is a cross-sectional view of a nuclear reactor chimney according to a non-limiting embodiment of the present disclosure. Referring to FIG. 3, the chimney 308 may include a hollow body with an interior surface and an opposing exterior surface 310. The chimney 308 may be a cylindrical structure that is open at both ends. The chimney 308 includes trip structures 320 and 322 on the exterior surface 310 of the chimney 308. The trip structures 320 have a first length from the exterior surface 310 of the chimney 308, while the trip structures 322 have a second length from the exterior surface 310 of the chimney 308. The second length is greater than the first length. The height of the trip structures 320 and 322 is parallel to the elongated body of the chimney 308 and perpendicular to the length. The length of the trip structures 320 and 322 is perpendicular to the exterior surface 310 of the chimney 308. The length may be equal to or greater than the height, although example embodiments are not limited thereto.

While FIG. 3 shows that the chimney 308 has both trip structures 320 and 322, it should be understood that the chimney 308 may have only trip structures 320 or only trip structures 322 such all of the trip structures have the same length from the exterior surface 310 of the chimney 308. Alternatively, the trip structures 320 and 322 may be alternately arranged to form an undulating profile (as shown on the right side of the chimney 308 in FIG. 3). In particular, trip structures of two, three, or more different lengths may be arranged at regular intervals to form various profiles (e.g., wave-like profiles, saw-tooth profiles). The spacing between the trip structures 320 and 322 may be regular or irregular. The spacing between the trip structures 320 and 322 may be greater than the length, although example embodiments are not limited thereto. The trip structures 320 and 322 may also form various arrays, designs, and patterns based on a front view of the chimney 308. Additionally, while the trip structures 320 and 322 appear polygonal based on their profile, it should be understood that the trip structures 320 and 322 may be polygonal or cylindrical structures (e.g., pipe-like structures) based on a front view of the chimney 308.

Figure 4:
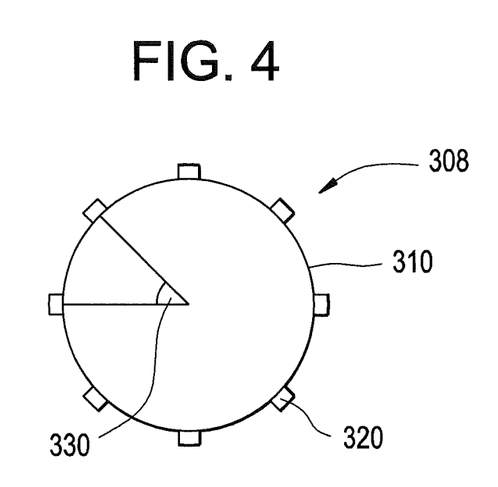
FIG. 4 is a top view of a nuclear reactor chimney according to a non-limiting embodiment of the present disclosure.

FIG. 4 is a top view of a nuclear reactor chimney according to a non-limiting embodiment of the present disclosure. Referring to FIG. 4, the plurality of trip structures 320 protrude radially from the exterior surface 310 of the hollow body of the chimney 308. The trip structures may have an angular separation 330 of about 10 degrees to about 45 degrees.

Figure 5:
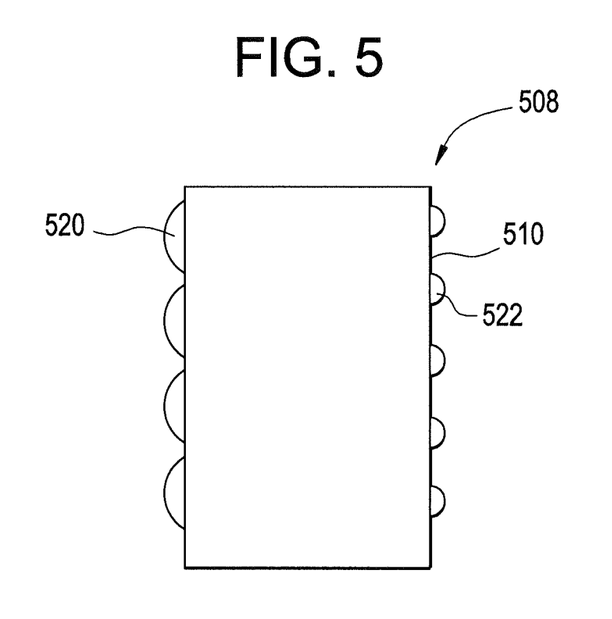
FIG. 5 is a cross-sectional view of a nuclear reactor chimney according to another non-limiting embodiment of the present disclosure.

FIG. 5 is a cross-sectional view of a nuclear reactor chimney according to another non-limiting embodiment of the present disclosure. Referring to FIG. 5, the chimney 508 includes trip structures 520 and 522 on the exterior surface 510 of the chimney 508. The trip structures 520 and 522 are curved structures, with the trip structures 520 being larger than the trip structures 522. For instance, the trip structures 520 and/or 522 may be partial spherical structures (e.g., hemispherical structures), although example embodiments are not limited thereto. The size of the trip structures 520 may also be increased such that adjacent trip structures 520 are in contact with each other. Furthermore, it should be understood that the variations and alternatives discussed in connection with FIGS. 3-4 are also applicable here.

Figure 6:
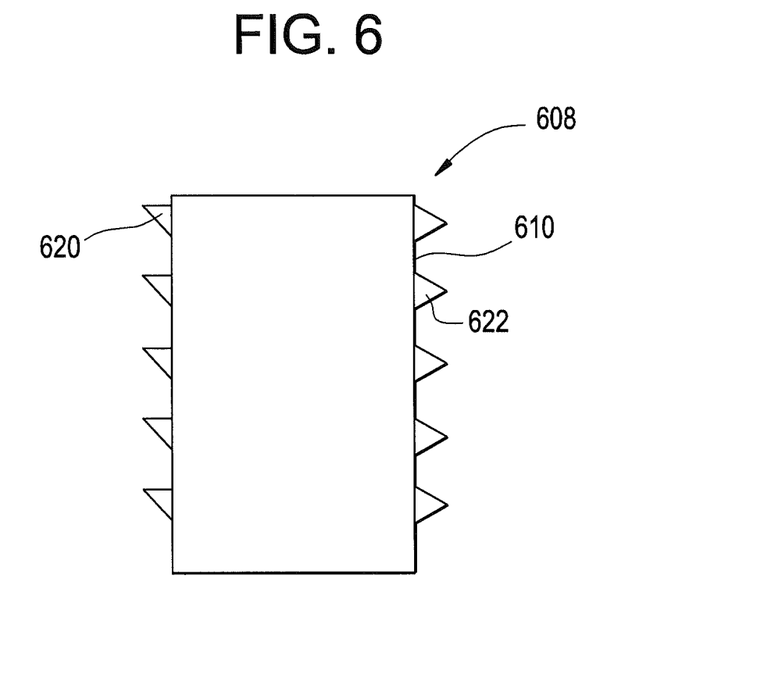
FIG. 6 is a cross-sectional view of a nuclear reactor chimney according to another non-limiting embodiment of the present disclosure.

FIG. 6 is a cross-sectional view of a nuclear reactor chimney according to another non-limiting embodiment of the present disclosure. Referring to FIG. 6, the chimney 608 includes trip structures 620 and 622 on the exterior surface 610 of the chimney 608. The trip structure 620 may have a profile that resembles a right triangle. In particular, the trip structures 620 have a level upper surface and an angled lower surface that slopes down to the exterior surface 610 of the hollow body of the chimney 608. The upper surface of the trip structure 620 may be perpendicular to the exterior surface 610 of the chimney 608. The trip structure 622 may have a profile that resembles an isosceles triangle (e.g., equilateral triangle), although example embodiments are not limited thereto. Furthermore, it should be understood that the variations and alternatives discussed in connection with FIGS. 3-5 are also applicable here.

Figure 7:
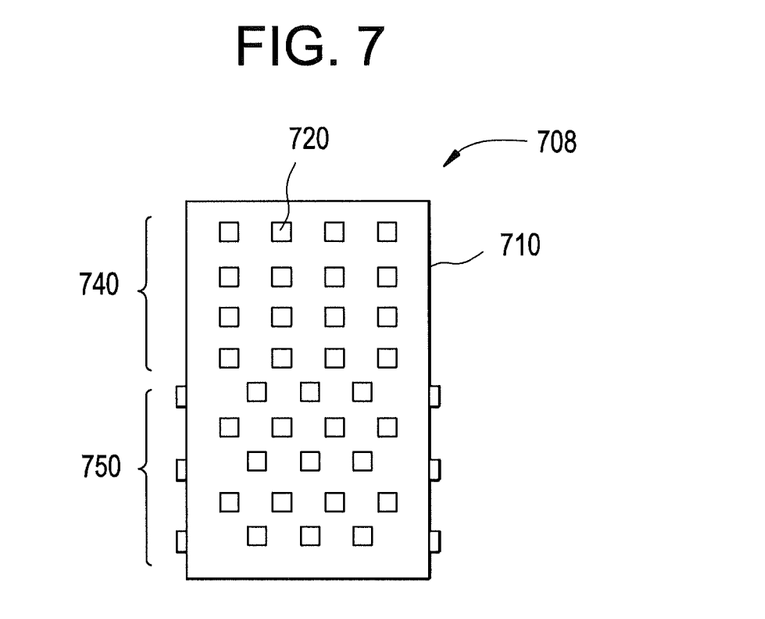
FIG. 7 is a side view of a nuclear reactor chimney according to another non-limiting embodiment of the present disclosure.

FIG. 7 is a side view of a nuclear reactor chimney according to another non-limiting embodiment of the present disclosure. Referring to FIG. 7, a plurality of trip structures 720 are arranged periodically throughout an entirety of the exterior surface 710 of the hollow body of the chimney 708. The first arrangement 740 includes aligned rows of the trip structures 720 so as to form a regular array. The second arrangement 750 includes staggered rows of the trip structures 720 so as to form a staggered array (e.g., checker pattern). It should be understood that the chimney 708 may include only the first arrangement 740, only the second arrangement 750, both the first arrangement 740 and the second arrangement 750, or a combination involving other patterns. The plurality of trip structures 720 may occupy about 40% to about 80% of the exterior surface of the hollow body. Additionally, although the trip structures 720 are shown as being shaped or oriented so as to have square cross sections or rectangular cross sections, it should be understood that the trip structures 720 may alternatively be shaped or oriented so as to have diamond-like cross sections. Furthermore, it should be understood that the variations and alternatives discussed in connection with FIGS. 3-6 are also applicable here.

Figure 8:
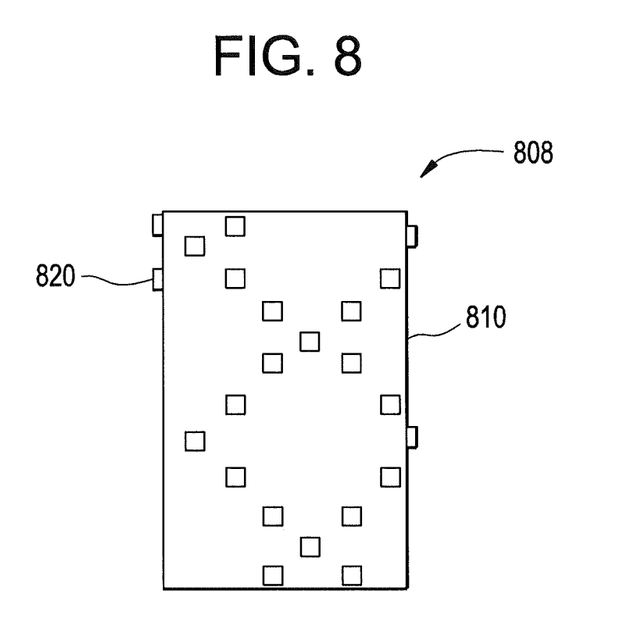
FIG. 8 is a side view of a nuclear reactor chimney according to another non-limiting embodiment of the present disclosure.

FIG. 8 is a side view of a nuclear reactor chimney according to another non-limiting embodiment of the present disclosure. Referring to FIG. 8, the chimney 808 includes trip structures 820 arranged in a criss-cross pattern on the exterior surface 810 of the chimney 808. It should be understood that the size of the criss-cross pattern may be varied from that shown in FIG. 8. Furthermore, it should be understood that the variations and alternatives discussed in connection with FIGS. 3-7 are also applicable here.

Figure 9:
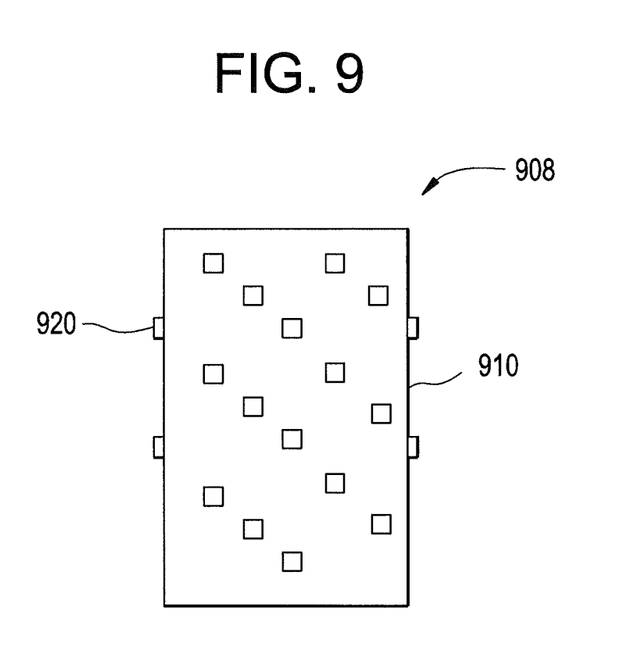
FIG. 9 is a side view of a nuclear reactor chimney according to another non-limiting embodiment of the present disclosure.

FIG. 9 is a side view of a nuclear reactor chimney according to another non-limiting embodiment of the present disclosure. Referring to FIG. 9, the chimney 908 includes trip structures 920 arranged in a spiral pattern on the exterior surface 910 of the chimney 908. Furthermore, it should be understood that the variations and alternatives discussed in connection with FIGS. 3-8 are also applicable here.

Figure 10:
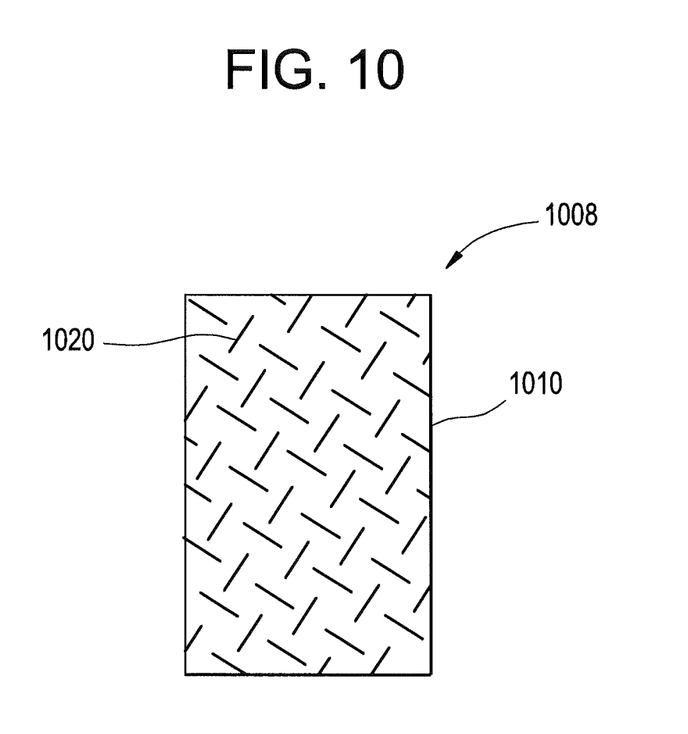
FIG. 10 is a side view of a nuclear reactor chimney according to another non-limiting embodiment of the present disclosure.

FIG. 10 is a side view of a nuclear reactor chimney according to another non-limiting embodiment of the present disclosure. Referring to FIG. 10, the chimney 1008 includes trip structures 1020 that are in the form of vanes on the exterior surface 1010 of the chimney 1008. The vanes are arranged in an angled and staggered, intersecting pattern. The vanes may be ridge or blade structures, although example embodiments are not limited thereto. Furthermore, it should be understood that the variations and alternatives discussed in connection with FIGS. 3-9 are also applicable here.

Figure 11:
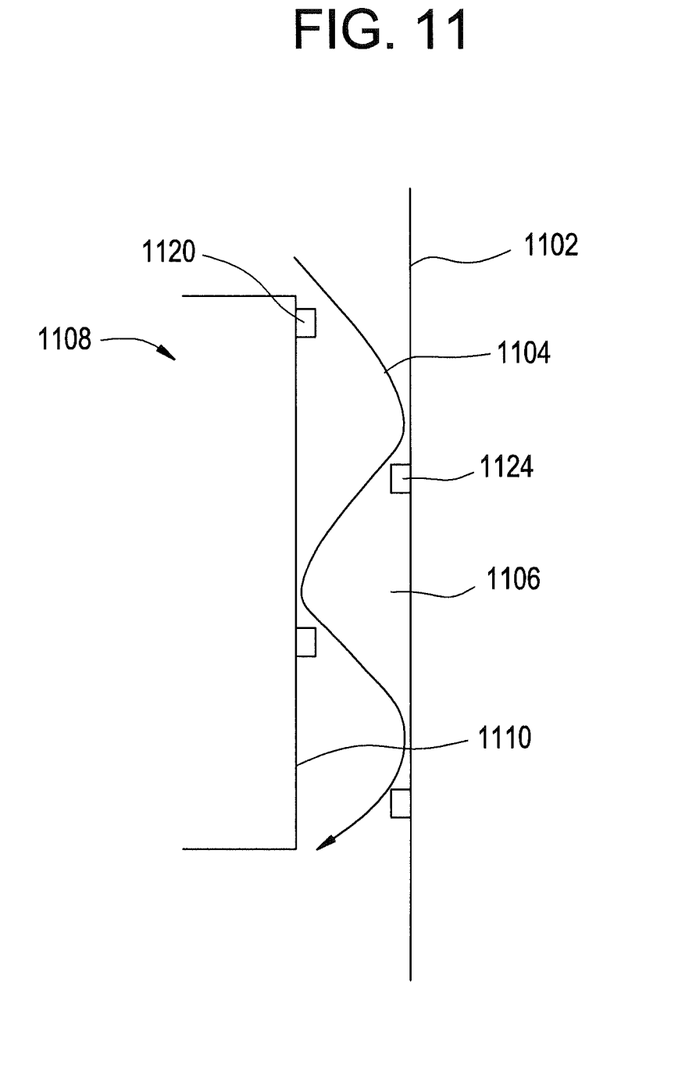
FIG. 11 is a cross-sectional view of a downcomer region with trip structures on both the nuclear reactor chimney and the reactor pressure vessel according to a non-limiting embodiment of the present disclosure.

FIG. 11 is a cross-sectional view of a downcomer region with trip structures on both the nuclear reactor chimney and the reactor pressure vessel according to a non-limiting embodiment of the present disclosure. Referring to FIG. 11, the chimney 1108 includes trip structures 1120 on the exterior surface 1110 of the chimney 1108. The reactor pressure vessel 1102 also includes trip structures 1124 on the inner surface of the reactor pressure vessel 1102. The exterior surface 1110 of the chimney 1108 and the inner surface of the reactor pressure vessel 1102 define a downcomer region 1106 in between. The trip structures 1120 and 1124 help facilitate an undulating flow 1104 through the downcomer region 1106.

The principles of convective mass transfer may be used to understand mixing efficiency. Definitions of the pertinent parameters, subscripts, and dimensionless quantities are provided below.

Definition of Parameters:
  d: diameter of pipe, meters
  e: fin or rib height, meters
  n: number of sharp corners facing flow (set as 1 for equation to provide numerical value)
  p: pitch of ribs/fins (distance between ribs and fins)
  α: contact angle (90° in all analysis to mimic direct flow)
  β: pitch degree of rib/fin (in degrees)
  s: smooth surface Dimensionless Quantities:
  Re: Reynolds number $$Re = \frac{\rho V d}{\mu},$$

relates inertial forces to viscous forces in flowing fluid
  Pr: Prandtl number $$Pr = \frac{Y}{a},$$

relates momentum diffusivity to thermal diffusivity
  Sh: Sherwood Number $$Sh = \frac{KL}{D},$$

relates convective mass transfer to diffusive mass transfer. Used here to show an increase in convective mass transfer.
  Sc: Schmidt Number $$Sc = \frac{Y}{D},$$

relates momentum diffusivity to mass diffusivity, used in correlation for Sherwood number calculations. The diffusivity of water in water was used in the Sc calculations.

Nu: Nusselt Number $$Nu = \frac{hL}{k_f},$$

relates convective heat transfer to conductive heat transfer.

Fanning Friction Factor Increase Over Smooth Pipe for Rib or Fin:

$$\frac{f_e}{f_s} = \left\{1 + \left[\frac{Re^{(0.67-0.06\frac{p}{d}-0.49\frac{\alpha}{90})} * \left(\frac{e}{d}\right)^{1.37-1.76\frac{p}{d}} *}{\left(\frac{p}{d}\right)^{(-1.66*10^{-6}*Re-0.33\frac{\alpha}{90})} * \left(\frac{\alpha}{90}\right)^{4.59+4.11*10^{-6}*Re-0.15\frac{p}{d}} *} \left(1 + \frac{2.94}{\sin\beta}\right)\right]^{\frac{15}{16}}\right\}^{\frac{16}{15}}$$

Nusselt Number Increase Over Smooth Pipe for Rib and Fin:

$$\frac{Nu_e}{Nu_s} = \left\{1 + \left[2.64 Re^{0.0036}\left(\frac{e}{d}\right)^{0.212}\left(\frac{p}{d}\right)^{-0.21}\left(\frac{\alpha}{90}\right)^{0.29} Pr^{-0.024}\right]^7\right\}^{\frac{1}{7}}$$

The Sherwood Number is the mass transfer correlation of the Nusselt Number, which relates convective to diffusive mass transfer. So that equation can be written as:

$$\frac{Sh_e}{Sh_s} = \left\{1 + \left[2.64 Re^{0.0036}\left(\frac{e}{d}\right)^{0.212}\left(\frac{p}{d}\right)^{-0.21}\left(\frac{\alpha}{90}\right)^{0.29} Sc^{-0.024}\right]^7\right\}^{\frac{1}{7}}$$

Where the Prandtl number was replaced by the Schmidt number, which is its mass transfer corollary.

Figure 12:
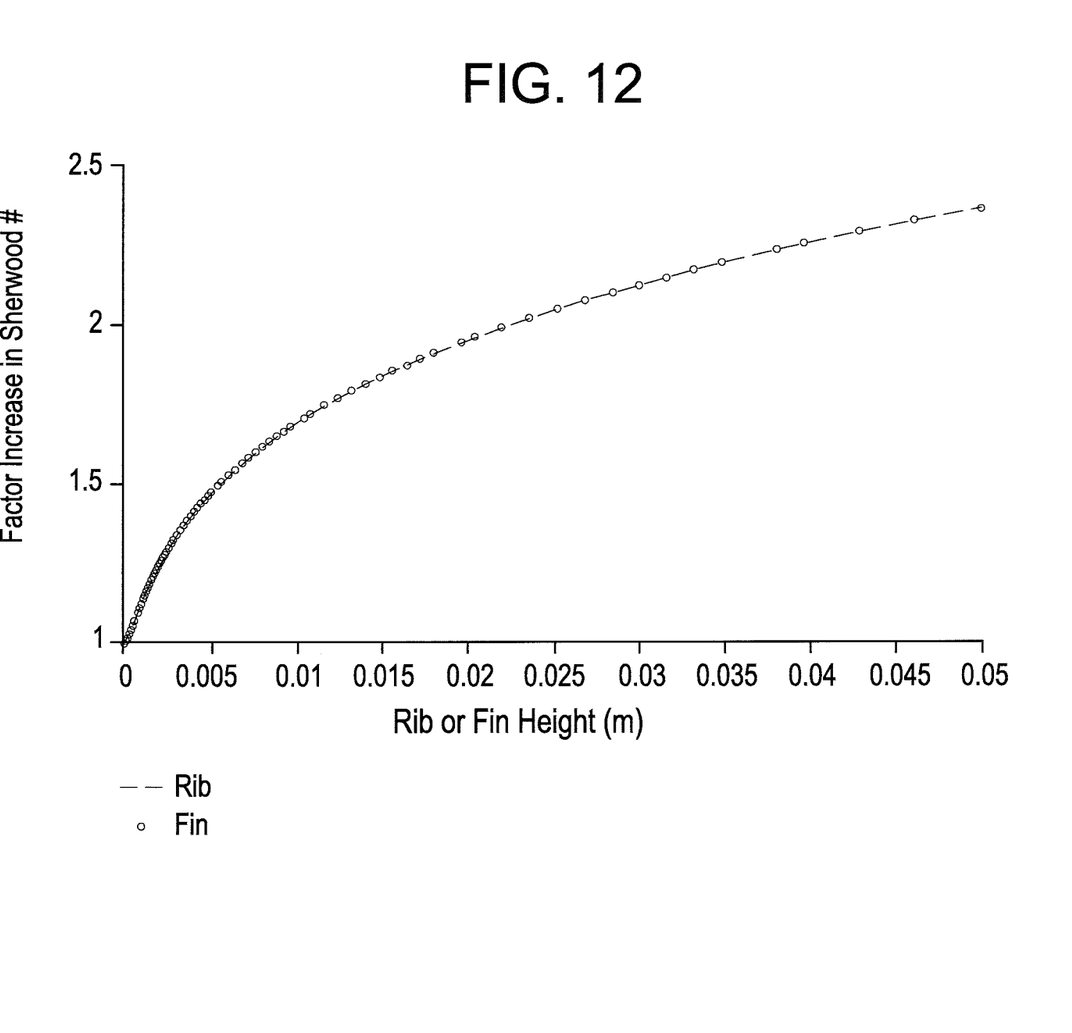
FIG. 12 is a graph showing a factor increase in Sherwood number versus an extent of protrusion of a trip structure.

FIG. 12 is a graph showing a factor increase in Sherwood number versus an extent of protrusion of a trip structure. Referring to FIG. 12, the Sherwood number calculation was unable to distinguish between ribs and fins, and thus, graphs for the two differing geometries lie on top of one another, showing only one line. This came as a as a result of the correlation not accounting for the curvature, or lack thereof, of the object increasing the mixing in the flow. The overall trend does show increase in Sherwood number as a function of rib or fin height.

Figure 13:
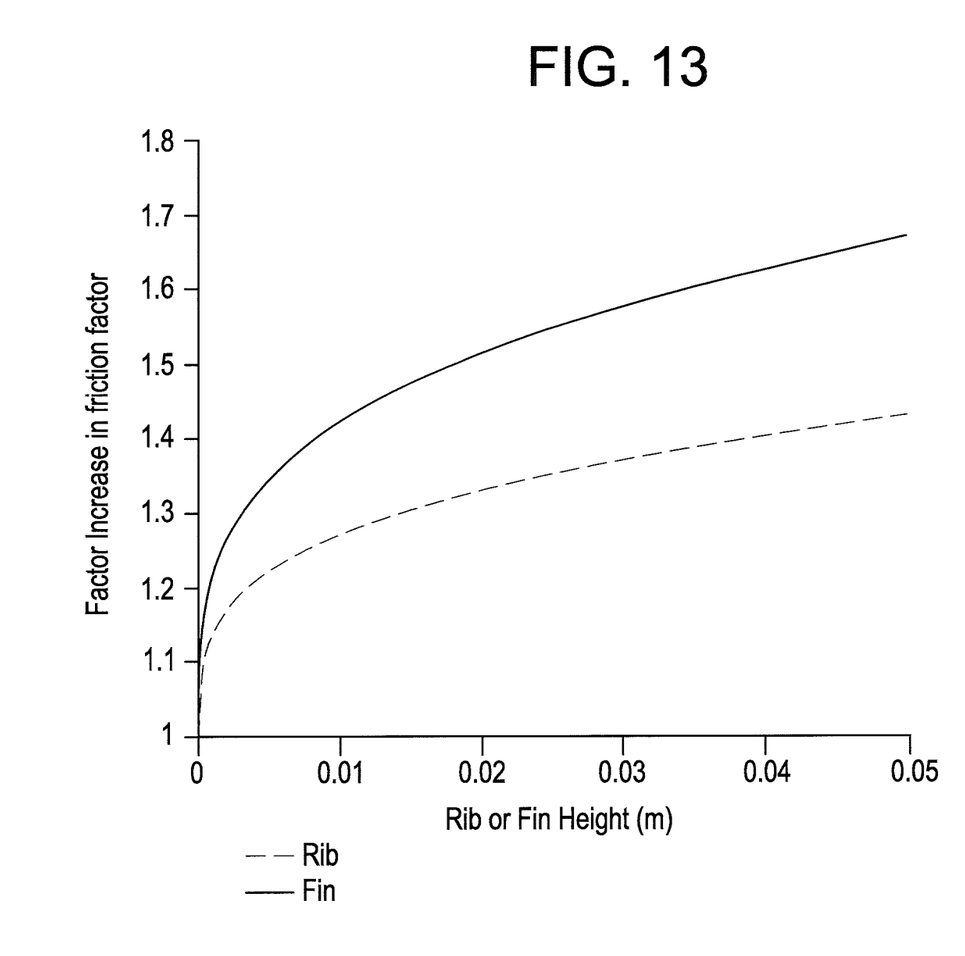
FIG. 13 is a graph showing a factor increase in Fanning friction factor versus an extent of protrusion of a trip structure.

FIG. 13 is a graph showing a factor increase in Fanning friction factor versus an extent of protrusion of a trip structure. Referring to FIG. 13, there is an increase in Fanning friction factor as a function of rib or fin height. Fin geometry increases friction factor more so than rib geometry at the same rib or fin height, which suggests an additional increase in mixing efficiency as a result of an increased rate of energy dissipation. It is also important to note that the Reynolds number in this simulation was a factor of 2 higher than the upper bound on the correlations used. The calculations show a large potential increase in mixing efficiency as a result of the finned or ribbed geometry additions.

According to an example embodiment, a method of improving a core inlet enthalpy of a nuclear reactor may include interrupting a downward flow of water within a downcomer region of a reactor pressure vessel with a plurality of first trip structures. The downcomer region is an annular space defined by the reactor pressure vessel and a chimney within the reactor pressure vessel. The plurality of first trip structures are disposed on an exterior surface of the chimney. The interrupting may include disrupting the downward flow of water with a planar surface of the plurality of first trip structures. The planar surface may be perpendicular to the exterior surface of the chimney. The interrupting may include disrupting the downward flow of water with a curved surface of the plurality of first trip structures. The plurality of first trip structures protrude a first length into the annular space, the first length being about 1% to about 15% of a distance between the exterior surface of the chimney and the reactor pressure vessel. The interrupting may include directing the downward flow of water away from the exterior surface of the chimney and toward the reactor pressure vessel. The interrupting may additionally include creating an undulating flow of the water through the downcomer region. The interrupting may also include increasing thermal uniformity such that a temperature of the water at a bottom of the downcomer region varies by no more than 5 degrees Celsius. The downcomer region may span at least 7 meters. The method may further include interrupting the downward flow of the water within the downcomer region with a plurality of second trip structures, wherein the plurality of second trip structures are disposed on an inner surface of the reactor pressure vessel.

As a result, more consistent and mixed core inlet conditions may be achieved, thereby allowing the reactor to more easily reach rated core thermal power. Another advantage is the flexibility in the chimney length to support better refueling and less space on the refuel floor. The radial power distribution across the core may also be reduced.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of improving a core inlet enthalpy for a core of a nuclear reactor, comprising:
   directing a downward flow of water to an inlet of the core of the nuclear reactor; and
   interrupting the downward flow of the water within a downcomer region of a reactor pressure vessel of the nuclear reactor with a plurality of first trip structures and a plurality of second trip structures, the downcomer region being an annular space defined by the reactor pressure vessel and a chimney within the reactor pressure vessel, the plurality of first trip structures disposed on an exterior surface of the chimney and spaced apart from an inner surface of the reactor pressure vessel, the plurality of second trip structures disposed on the inner surface of the reactor pressure vessel and spaced apart from the exterior surface of the chimney, the plurality of second trip structures arranged in a staggered manner relative to the plurality of first trip structures so as to alter the downward flow of the water to an undulating flow of the water that enhances axial and radial mixing to thereby improve the core inlet enthalpy for the core of the nuclear reactor.

2. The method of claim 1, wherein the interrupting includes disrupting the downward flow of the water with a planar surface of the plurality of first trip structures.

3. The method of claim 2, wherein the planar surface is perpendicular to the exterior surface of the chimney.

4. The method of claim 1, wherein the interrupting includes disrupting the downward flow of the water with a curved surface of the plurality of first trip structures.

5. The method of claim 1, wherein the plurality of first trip structures protrude a first length into the annular space, the first length being about 1% to 15% of a distance between the exterior surface of the chimney and the reactor pressure vessel.

6. The method of claim 1, wherein the interrupting includes directing the downward flow of the water away from the exterior surface of the chimney and toward the reactor pressure vessel.

7. The method of claim 1, wherein the interrupting includes increasing thermal uniformity such that a temperature of the water at a bottom of the downcomer region varies by no more than 5 degrees Celsius at a given point in time.

8. The method of claim 1, wherein the downcomer region spans at least 7 meters.

9. The method of claim 1, wherein the plurality of first trip structures protrude to different extents into the downcomer region.

10. The method of claim 1, wherein the directing includes guiding the downward flow such that the water is fed to the inlet of the core of the nuclear reactor.

11. The method of claim 1, wherein the interrupting occurs upstream from the inlet of the core of the nuclear reactor.

* * * * *